(12) United States Patent
Shilale (10) Patent No.: US 6,863,855 B2
(45) Date of Patent: Mar. 8, 2005

(54) METHOD OF MAKING A CABLE TIE USING INSERT MOLDING

(75) Inventor: Thomas Shilale, Douglas, MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/858,202

(22) Filed: May 15, 2001

(65) Prior Publication Data

US 2002/0170155 A1 Nov. 21, 2002

(51) Int. Cl.⁷ .................. B29C 45/14; B29C 70/72
(52) U.S. Cl. .................. 264/151; 264/148; 264/153; 264/154; 264/250; 264/267; 264/274
(58) Field of Search .................. 264/145, 148, 264/151, 153, 154, 163, 250, 254, 255, 259, 267, 271.1, 273, 274, 275, 294; 24/16 PB (56) References Cited

U.S. PATENT DOCUMENTS

| | | |
|---|---|---|
| 2,082,833 A | 6/1937 | Haupt |
| 3,186,047 A | 6/1965 | Schwester et al. |
| D205,659 S | 9/1966 | Piasecki |
| 3,660,869 A | 5/1972 | Caveney et al. |
| 3,872,547 A | 3/1975 | Caveney et al. |
| 3,949,449 A | 4/1976 | Caveney et al. |
| 3,996,646 A | 12/1976 | Caveney |
| 4,092,765 A | 6/1978 | Joyce |

(List continued on next page.)

FOREIGN PATENT DOCUMENTS

JP          52021997         2/1977

*Primary Examiner*—Angela Ortiz
(74) *Attorney, Agent, or Firm*—Kriegsman & Kriegsman (57) ABSTRACT

Cable tie and method of making the same. In a preferred embodiment, the method comprises continuously forming a length of strap material using a rotary extrusion process, the strap material having laterally-extending teeth disposed along its entire length. The continuous length of strap material is then cut into individual straps of desired length, with the ends of each strap being shaped to desired profiles. A transverse hole may also be formed in the strap proximate to its front end. A front portion comprising a head is then insert-molded around the front end of the strap and, if present, the transverse hole in the strap. The head is provided with a transverse channel through which the tail end of the strap may be inserted and a locking tang lockably engageable with the teeth once inserted therepast.

12 Claims, 5 Drawing Sheets

U.S. PATENT DOCUMENTS

| | | | | |
|---|---|---|---|---|
| 4,236,280 A | | 12/1980 | Kreiseder | |
| 4,272,870 A | | 6/1981 | McCormick | |
| 4,393,548 A | | 7/1983 | Herb | |
| 4,432,127 A | * | 2/1984 | Diazzi | 264/242 |
| 4,462,784 A | | 7/1984 | Russell | |
| 4,473,524 A | | 9/1984 | Paradis | |
| 4,532,679 A | | 8/1985 | Scott | |
| 4,580,319 A | | 4/1986 | Paradis | |
| 4,585,600 A | | 4/1986 | Rollyson et al. | |
| 4,636,347 A | * | 1/1987 | Kato | 264/154 |
| 4,658,478 A | | 4/1987 | Paradis | |
| 4,688,302 A | | 8/1987 | Caveney et al. | |
| 4,730,615 A | * | 3/1988 | Sutherland et al. | 606/215 |
| 4,754,529 A | | 7/1988 | Paradis | |
| 4,776,067 A | * | 10/1988 | Sorensen | 24/16 PB |
| 4,866,816 A | | 9/1989 | Caveney | |
| 4,875,647 A | * | 10/1989 | Takagi et al. | 24/16 PB |
| 5,028,225 A | * | 7/1991 | Staheli | 264/145 |
| 5,037,595 A | * | 8/1991 | Kornelis | 264/153 |
| 5,039,040 A | * | 8/1991 | Idjakiren | 248/73 |
| 5,134,765 A | * | 8/1992 | Roberts et al. | 29/413 |
| 5,360,588 A | * | 11/1994 | Heyn et al. | 264/153 |
| 5,372,773 A | | 12/1994 | Sorensen et al. | |
| 5,389,330 A | | 2/1995 | Sorensen et al. | |
| 5,440,786 A | | 8/1995 | Sorensen et al. | |
| 5,470,520 A | | 11/1995 | Sorensen et al. | |
| 5,494,630 A | * | 2/1996 | Eraybar et al. | 156/211 |
| 5,593,630 A | | 1/1997 | Sorensen et al. | |
| 5,669,111 A | | 9/1997 | Rohaly | |
| 5,690,883 A | | 11/1997 | Sorensen et al. | |
| 5,693,282 A | | 12/1997 | Sorensen et al. | |
| 5,716,579 A | | 2/1998 | Sorensen et al. | |
| 5,746,965 A | | 5/1998 | Sorensen et al. | |
| 5,792,409 A | | 8/1998 | Sorensen et al. | |
| 5,846,473 A | | 12/1998 | Sorensen et al. | |
| 6,003,209 A | | 12/1999 | Oh et al. | |
| 6,044,524 A | | 4/2000 | Sorensen et al. | |
| 6,076,234 A | * | 6/2000 | Khokhar et al. | 24/16 PB |
| 6,119,324 A | | 9/2000 | Suess | |
| 6,464,917 B1 | * | 10/2002 | Piec et al. | 264/161 |

* cited by examiner

METHOD OF MAKING A CABLE TIE USING INSERT MOLDING

BACKGROUND OF THE INVENTION

The present invention relates generally to cable ties and relates more particularly to a method of making cable ties using an insert molding technique and also to cable ties made by said method.

Cable ties, also known as bundling ties and harnessing devices, are well known devices commonly used in the art to couple together a plurality of elongated objects, such as wires or cables. One type of cable tie which is well known and widely used in the art comprises an elongated strap having an apertured head disposed at one end thereof. The opposite end of the elongated strap is typically shaped to define a tail of narrowed width adapted for insertion through the apertured head to form a closed loop. A plurality of serrations or teeth are formed along the length of the elongated strap, and an internal pawl (or locking tang) is disposed within the apertured head, said internal pawl being adapted to prevent a serration on the strap, once inserted past said internal pawl, from being withdrawn therepast. In this manner, the engagement of the internal pawl with the serrated strap is used to lock the cable tie in a closed loop configuration.

Examples of cable ties of the above construction are disclosed in the following U.S. patents, all of which are incorporated herein by reference: U.S. Pat. No. 4,658,478, inventor Paradis, issued Apr. 21, 1987; U.S. Pat. No. 4,754,529, inventor Paradis, issued Jul. 5, 1988; U.S. Pat. No. 5,593,630, inventors Sorensen et al., issued Jan. 14, 1997; and U.S. Pat. No. 5,669,111, inventor Rohaly, issued Sep. 23, 1997.

Another type of cable tie which is well known and widely used in the art differs from the above-described cable tie in that it comprises an apertured or ladder-type strap, instead of a serrated strap. The head of the cable tie typically has a buckle-like shape and includes a tongue that is adapted to enter the apertures of the strap to lock the strap in a fixed loop configuration.

Examples of cable ties of the above ladder-type strap construction are disclosed in the following U.S. patents, all of which are incorporated herein by reference: U.S. Pat. No. 3,766,608, inventor Fay, issued Oct. 23, 1973; U.S. Pat. No. 4,347,648, inventor Dekkers, issued Sep. 7, 1982; and U.S. Pat. No. 4,866,816, inventor Caveney, issued Sep. 19, 1989.

Cable ties, whether of the serrated-strap variety described above or the ladder-strap variety described above, are typically formed by injection molding. More specifically, this typically involves the use of a two-piece mold into which the impression of one or more whole cable ties has been formed. Molten plastic (more typically nylon and less typically polypropylene) is injected into the mold through a single opening or gate in the mold until the one or more impressions therein are filled. The molten plastic is then allowed to harden in the one or more impressions. The thus-formed cable ties are then removed from the mold.

The present inventor has noted the following disadvantages associated with the aforementioned injection molding technique for making cable ties: First, because the above-described process involves molding the entirety of a cable tie at one time, the length of the cable tie strap is necessarily limited by the size of its corresponding impression. Consequently, to make a variety of cable ties having straps of different lengths, it is generally necessary to use different sized impressions. This typically results in the need for many differently-sized molds as the impressions of any given mold are typically fixed in size and identical to one another. As can readily be appreciated, the provision of many differently-sized molds may be prohibited by cost as molds are very expensive to produce. Moreover, the use of different sized molds may require the adaptation of other equipment used in the manufacturing process.

Second, because the above-described process requires that the entirety of the cable tie be formed at one time, cable ties having long strap lengths (i.e., several feet) require correspondingly large molds. Molds of such large size are particularly expensive to produce. In addition, because cable tie molds typically have only a single gate through which molten plastic is injected (to prevent the occurrence of knit lines—especially in those instances in which nylon is the molten plastic used), the cycle time can be rather long as the molten plastic must travel through the single gate in the mold until it fills the entireties of all of the impressions. In addition, the aforementioned forcing of the molten plastic through the entireties of the impressions often results in some degradation of the molten plastic material, such degradation being undesirable.

One patent of interest is U.S. Pat. No. 6,003,209, inventors Oh et al., which issued Dec. 21, 1999, and which is incorporated herein by reference. In the aforementioned patent, there is disclosed a filamentary fastener and a method of making the same, the method comprising the steps of (a) providing a length of flexible filamentary material; (b) providing a mold, said mold being shaped to include a paddle impression and a cross-bar impression, said paddle impression and said cross-bar impression being parallel to one another; (c) insert molding, using said mold, a first paddle and a first cross-bar onto said length of flexible filamentary material; (d) repositioning said length of flexible filamentary material relative to said mold so that said first paddle and said first cross-bar are spaced apart from said mold; (e) insert molding, using said mold, a second paddle and a second cross-bar onto said length of flexible filamentary material; and (f) cutting said length of flexible filamentary material between the paddle and the cross-bar formed during the same molding iteration to yield a fastener having a flexible filament with a paddle at one end and a cross-bar at the opposite end.

The process of the aforementioned patent is not adapted to making cable ties, but rather, is limited to making filamentary fasteners of the type having a cross-bar at one end thereof. In addition, the present inventor has noted that, with respect to the process of the aforementioned patent, the cutting step is performed after the second insert molding step. This is disadvantageous to large-scale production because only one fastener at a time can be formed using a given filament.

Another patent of interest is U.S. Pat. No. 4,636,347, inventor Kato, which issued Jan. 13, 1987, and which is incorporated herein by reference. The aforementioned patent relates to a fastener comprising a female member having an opening, a male member which is engageable in the opening of the female member and a string member joining the female and male members. The patent also relates to a fastener assembly comprising a plurality of such fasteners joined together. The female and male members of the fastener are molded from a thermoplastic synthetic resin and are fused to the string member. The fastener or fastener assembly is made by a method comprising placing a string through a female member forming mold and a male member forming mold, supplying a molten thermoplastic resin into the molds to form a female member and a male member, removing the molded female and male members from the molds, moving the string forward, repeating the molding of a plurality of female and male members, and if appropriate, cutting the string between the female member of one fastener and the male member of another.

The process of the foregoing patent is beset with the same types of limitations discussed above in connection with the process of U.S. Pat. No. 6,003,209 (i.e., said process is not adapted to making cable ties and requires the second molding on a string before the string can be cut).

SUMMARY OF THE INVENTION

It is an object of the present invention to provide a novel method for making a cable tie.

It is another object of the present invention to provide a method as described above that overcomes at least some of the shortcomings associated with existing methods for making cable ties.

Therefore, in furtherance of the above and other objects to be described or apparent from the description below, there is herein provided a method for making a cable tie, said method comprising the steps of (a) forming a strap, said strap having a front end and a tail; and (b) then, insert-molding a front portion onto said front end of said strap, said front a portion comprising a head, said head being adapted to cooperate with said strap to form a locked closed loop.

Preferably, said strap is made by forming a continuous length of strap material and then cutting said continuous length to obtain a plurality of individual straps. In this manner, straps of any desired length can readily be obtained. The strap has a top surface and a bottom surface, said bottom surface preferably being shaped to include along its entire length a pair of longitudinally-extending rails and a plurality of teeth laterally-extending between said rails. A transverse hole (or a projection or the like) may be formed in the strap proximate to the front end thereof to enhance mechanical adhesion between the strap and the front portion.

Preferably, the head of the cable tie is generally rectangular and is shaped to include a top, a bottom, a front, a back, a left side, a right side, a transverse channel extending from said top to said bottom and a locking tang extending into said channel. The transverse channel is dimensioned so that the tail of the strap may be inserted therethrough, and the locking tang is adapted to prevent a tooth on said strap, once inserted therepast, from being withdrawn. In this manner, the cable tie can be locked in a closed loop configuration.

The front portion of the cable tie preferably also comprises a neck, said neck extending rearwardly from the back of the head. The front end of the strap is preferably disposed within the neck.

The above-described method for making a cable tie may be performed manually or may be partially or fully automated. The forming of a continuous length of strap material is preferably performed using a rotary extrusion technique.

The strap and the front portion of the cable tie may be made of the same material or may be made of different materials.

The present invention is also directed to a cable tie made according to the method described above.

Additional objects, as well as features and advantages, of the present invention will be set forth in part in the description which follows, and in part will be obvious from the description or may be learned by practice of the invention.

In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings, wherein like reference numerals represent like parts.

DETAILED DESCRIPTION OF PREFERRED EMBODIMENTS

Figure 1:
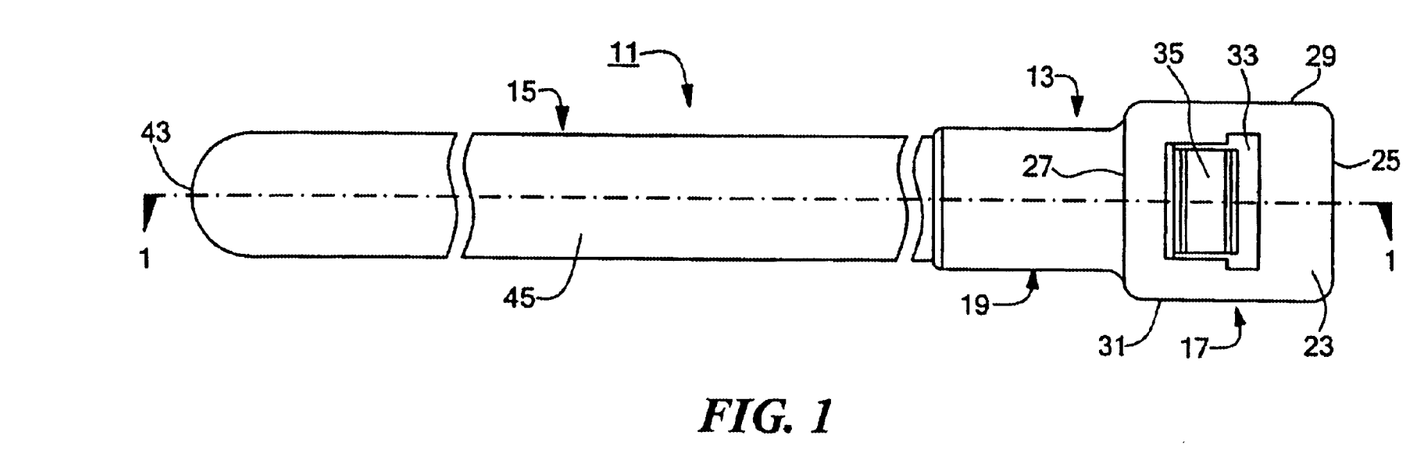
FIG. 1 is a top view of a first embodiment of a cable tie constructed according to the teachings of the present invention.
Figure 2:
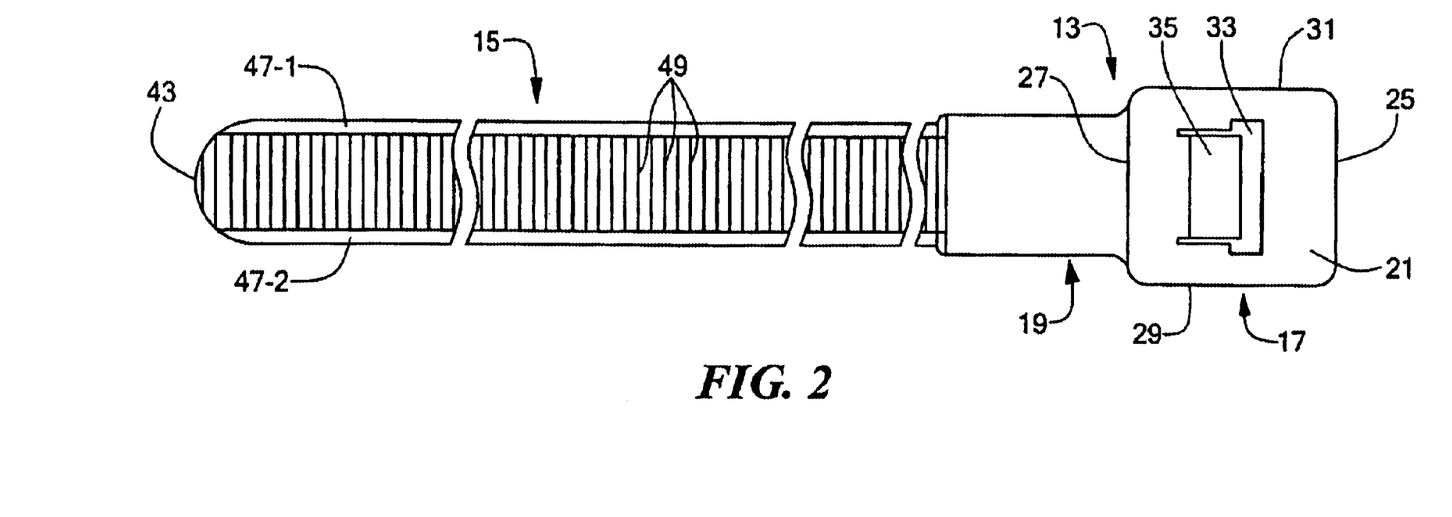
FIG. 2 is a bottom view of the cable tie of FIG. 1.
Figure 3:
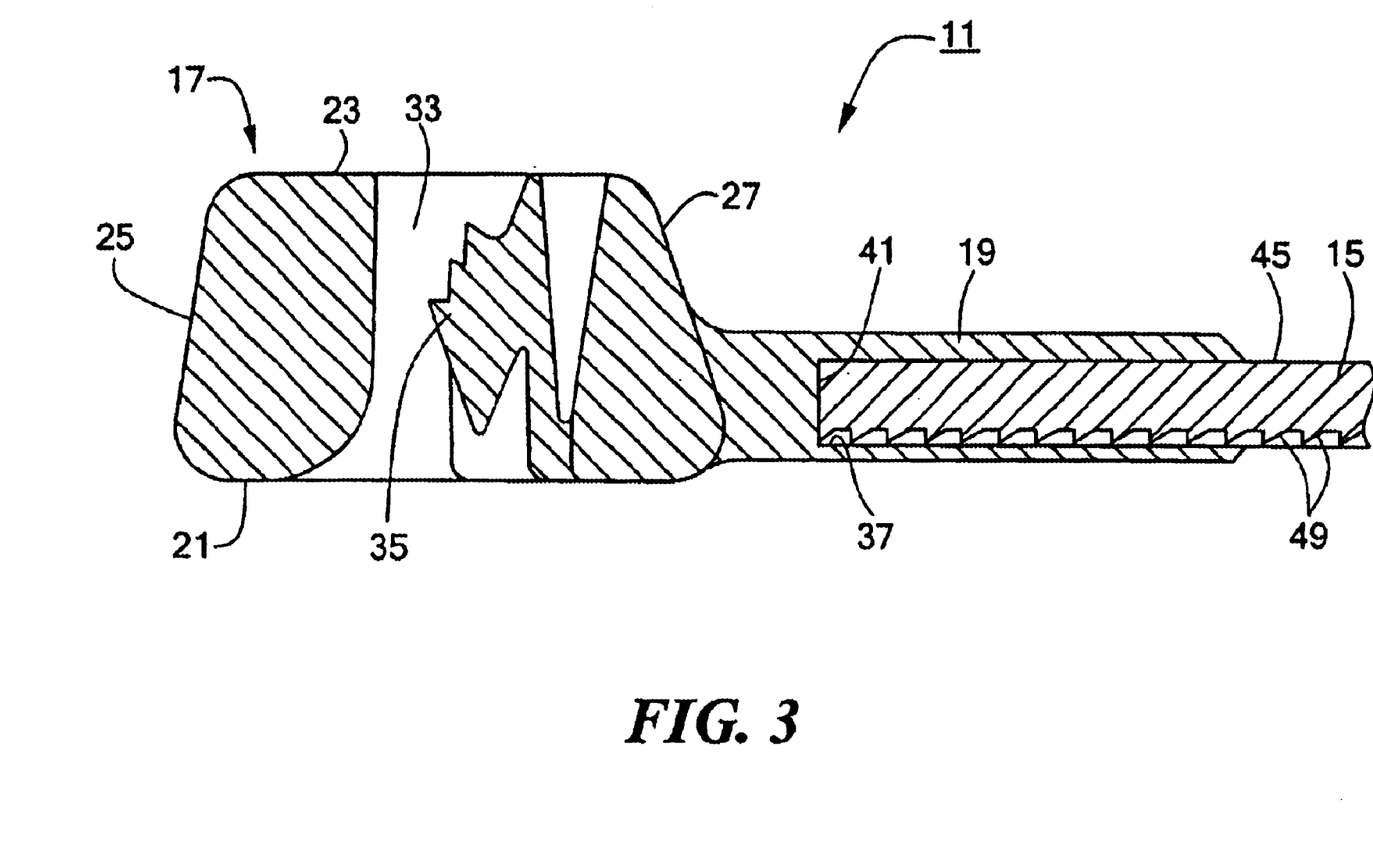
FIG. 3 is an enlarged fragmentary section view of the cable tie of FIG. 1 taken along line 1—1.

Referring now to FIGS. 1 through 3, there are shown various views of a first embodiment of a cable tie constructed according to the teachings of the present invention, said cable tie being represented generally by reference numeral 11.

Cable tie 11 comprises a front portion 13 and a strap 15. Front portion 13, in turn, comprises a head 17 and a neck 19. Head 17 is generally rectangular and is shaped to include a bottom wall 21, a top wall 23, a front wall 25, a rear wall 27, a left side wall 29, a right side wall 31 and an elongated channel 33 which extends through head 17 from bottom wall 21 to top wall 23. Head 17 is further shaped to include a locking tang 35 extending into channel 33. Tang 35 is similar in shape and function to tang 21 of U.S. Pat. No. 4,754,529.

Neck 19, which extends rearwardly from rear wall 27, is rectangular in cross-section and includes a rectangular slot 37, whose purpose will be explained below.

Strap 15, which is generally rectangular, is an elongated flexible member shaped to include a front end 41 fixedly disposed within slot 37 and a tail 43 of narrowed width insertable through channel 33 to form a closed loop. In addition, strap 15 is shaped to include a top surface 45 and a bottom surface, said bottom surface being shaped to include a pair of spaced-apart longitudinally extending rails 47-1 and 47-2 and a plurality of teeth 49 laterally extending between rails 47-1 and 47-2. Teeth 49 are adapted to lockably engage tang 35 once inserted therepast so as to lock tie 11 in a closed loop configuration.

In accordance with the teachings of the present invention, cable tie 11 is preferably made by (i) forming strap 15 and (ii) then, insert-molding front portion 13 around front end 41 of strap 15. Preferably, as will be explained below in greater detail, strap 15 is formed by continuously molding a length of strap material by a rotary extrusion process and then cutting the strap material to a desired length and shaping the ends as desired. However, it is to be understood that the present invention is not limited to the above method of forming strap 15 and that strap 15 may be formed using a variety of other methods, including, for example, non-rotary extrusion and injection molding. (The advantages of the aforementioned continuous rotary extrusion method are described or are apparent from the discussion below.)

All of the above steps may be performed manually; alternatively, some or all of these steps may be automated.

As noted above, once strap 15 has been formed, front portion 13 is then insert-molded around front end 41 of strap 15. This may be done by manually inserting strap 15 into a mold having an impression for front portion 13, injecting molten plastic into said mold, allowing the molded product to harden and then removing the molded product from the mold. In addition, as will be described below, one or more of the above steps may be automated.

Figure 4:
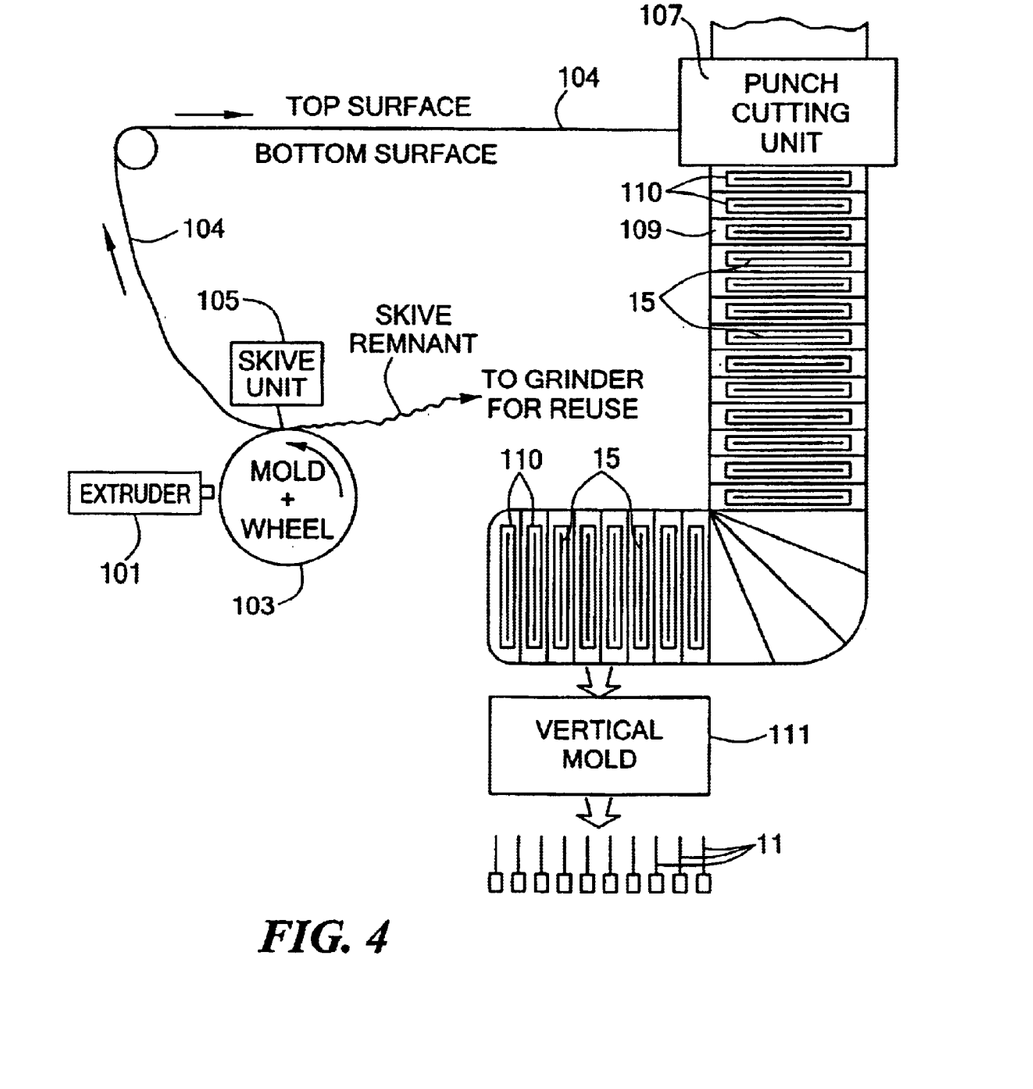
FIG. 4 is a schematic diagram of an automated method of making the cable tie of FIG. 1.

Referring now to FIG. 4, there is schematically shown a preferred method for making cable tie 11. As can be seen, said method is largely automated and comprises extruding molten plastic from an extruder 101 onto the periphery of a rotating mold wheel 103 (see U.S. Pat. No. 4,462,784, the disclosure of which is incorporated herein by reference), said periphery having a continuous impression (not shown) of rails 47-1 and 47-2 and teeth 49 that corresponds generally to the bottom surface of strap 15. As the molten plastic travels on rotating mold wheel 103, it hardens to the shape of the impression. A skive unit 105 is then used to remove the molded product from wheel 103 and to divert any excess or remnant plastic from wheel 103 for grinding and re-use. The resulting molded product is a continuous length of material 104 having the general shape of strap 15.

Figure 5A:
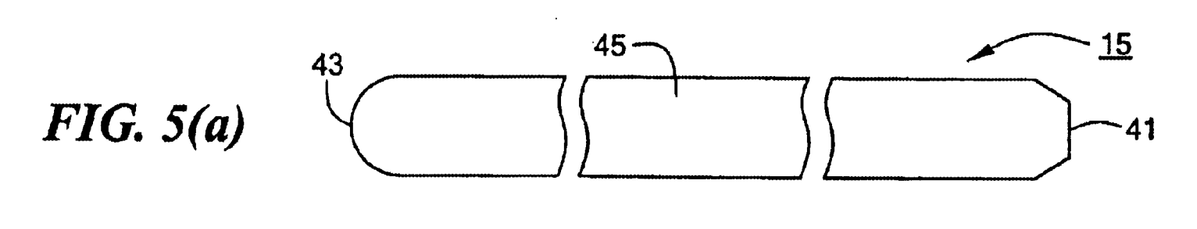
FIGS. 5(a) and 5(b) are top and bottom views, respectively, of the strap of the cable tie of FIG. 1.
Figure 5B:
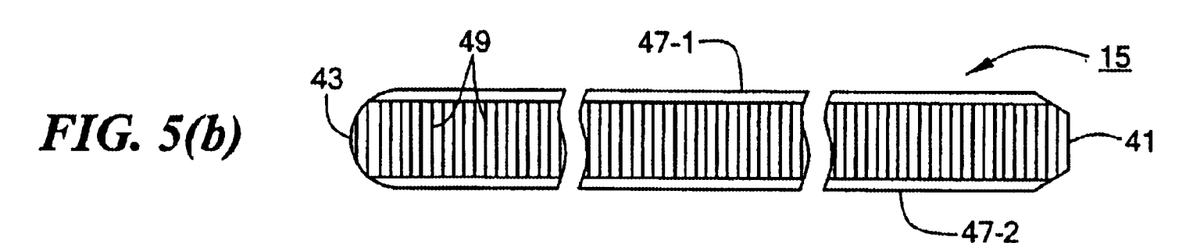

Said continuous length of strap material 104 is then fed into a punch-cutting unit 107. Punch-cutting unit 107 includes a pair of spaced-apart punch-cutting elements (not shown) for cutting the continuous length of material into individual straps and for providing the desired shape to the front and tail ends of strap 15. (An individual strap 15 thus formed is shown separately in FIGS. 5(a) and 5(b).) As can readily be appreciated, by varying the spacing between the spaced-apart punch-cutting elements, straps 15 of many different lengths can be obtained.

Individual straps 15 obtained using punch-cutting unit 107 are then dropped from unit 107 onto an indexing conveyor 109 preferably traveling in a direction perpendicular to the movement of the continuous strap into punch-cutting unit 107. Conveyor 109 is preferably shaped to include one or more sets of pockets 110, each set of pockets 110 consisting of approximately ten to twelve individual pockets 110, each individual pocket 110 being adapted to receive an individual strap 15. When each pocket 110 within a set has been filled with a strap 15, conveyor 109 delivers the full set to an injection mold 111. Mold 111 is preferably a vertical mold having a plurality of parallel impressions (not shown) aligned with the set of straps 15, each impression being in the shape of front portion 13 of cable tie 11. The front end 41 of each strap 15 is then pushed from its pocket 110 by pusher elements (not shown) into the neck portion 19 of a corresponding impression. Molten plastic is then injected into mold 111, and a front portion 13 is formed around front end 41 of each strap 15. After a short cooling period, mold 111 is opened and the thus-formed cable ties 11 are ejected from the mold 111 using ejection pins (not shown). The aforementioned insert-molding process is then repeated for the next set of straps 15.

As can readily be appreciated, one of the advantages of the above method is that cable ties having different strap lengths can easily be produced. Moreover, such cable ties can be produced using much of the same equipment, including the same mold for molding the front portion of the cable tie. Another advantage of the present method is that the problems of slow throughput and the degradation of molten plastic associated with the injection molding of cable ties of considerable strap length are ameliorated. Still another advantage of the present method is that, if desired, front portion 13 and strap 15 may be formed from different materials (e.g., different plastics or different grades of the same plastic).

Figure 6:
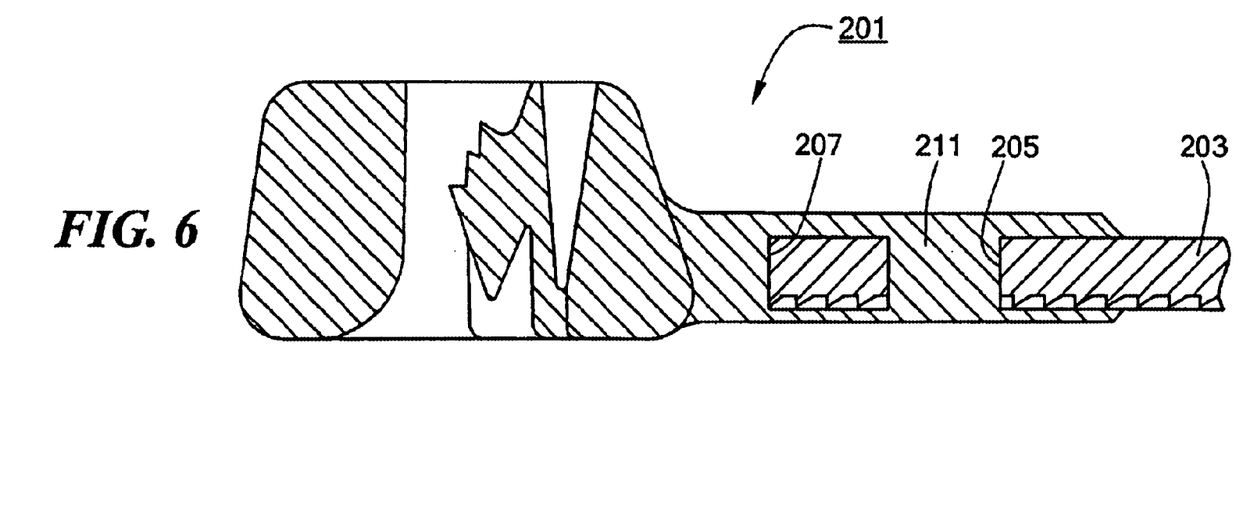
FIG. 6 is a fragmentary longitudinal section view of a second embodiment of a cable tie constructed according to the teachings of the present invention.

Referring now to FIG. 6, there is shown a longitudinal section view of a second embodiment of a cable tie constructed according to the teachings of the present invention, said cable tie being represented generally by reference numeral 201.

Figure 7A:
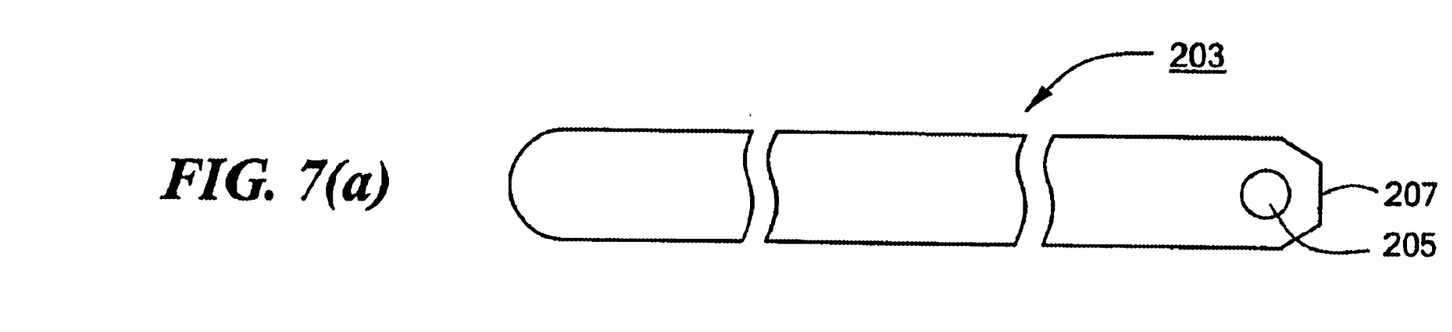
FIGS. 7(a) and 7(b) are top and bottom views, respectively, of the strap of the cable tie of FIG. 6.
Figure 7B:
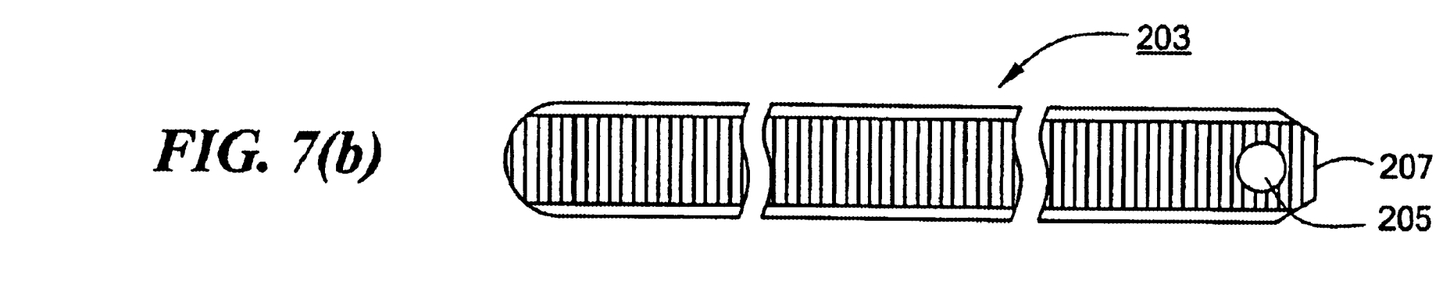

Cable tie 201 is similar in many respects to cable tie 11. One of the principal differences between the two cable ties is that cable tie 201 includes a strap 203 having a transverse hole 205 proximate to its front end 207 (see FIGS. 7(a) and 7(b)). Due to the presence of hole 205, when front portion 209 is insert-molded over front end 207, a portion of neck 211 is formed through hole 205, thereby enhancing the attachment of front portion 209 to strap 203. (Certain plastics, like nylon, do not adhere particularly well to themselves via insert-molding. Consequently, it is often necessary to enhance mechanical bonding by providing a mechanical adhesion promoting element in the item around which insert-molding occurs. In cable tie 11, the teeth 49 that are proximate to front end 41 serve in this capacity. In cable tie 201, said teeth 49 are supplemented by hole 205. As can readily be appreciated, hole 205 and/or said teeth 49 may be replaced with other mechanical adhesion promoting elements.)

Cable tie 201 may be made by an automated process substantially identical to that discussed above for cable tie 11, the only difference being the additional punch-cutting of hole 205 into strap 203.

It is to be understood that, whereas cable ties 11 and 201 are of the serrated-strap variety, the principles of the present invention could readily be applied to making cable ties of the ladder-strap variety.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of making a cable tie, said method comprising the steps of:
    (a) forming a strap, said strap having a front end and a tail, said forming step comprising forming a length of continuously molded strap material using rotary extrusion molding and then cutting said continuously molded strap material to yield an individual strap of finished size, wherein said cutting comprises punch-cutting said continuously molded strap material to a desired individual strap length and shaping the front and tail ends of the strap; and (b) then, insert-molding a front portion onto said front end of said strap, said front portion comprising a head, said head being adapted to cooperate with said strap to form a locked closed loop.

2. The method as claimed in claim 1 wherein said head is shaped to include a channel and a locking tang, said locking tang extending into said channel, and wherein said tail is shaped for insertion through said channel.

3. The method as claimed in claim 2 wherein said strap is shaped to include a plurality of teeth, said teeth lockably engaging said locking tang once inserted therepast.

4. The method as claimed in claim 1 wherein each of said strap and said front portion is made of plastic and wherein said strap forming step and said insert-molding step are performed using identical grades of the same plastic.

5. The method as claimed in claim 1 wherein each of said strap and said front portion is made of plastic and wherein said strap forming step and said insert-molding step are performed using different plastics.

6. The method as claimed in claim 1 wherein each of said strap and said front portion is made of plastic and wherein said strap forming step and said insert-molding step are performed using different grades of the same plastic.

7. The method as claimed in claim 1 wherein said strap forming step comprises forming a mechanical adhesion promoting element proximate to the front end of said strap.

8. The method as claimed in claim 7 wherein said mechanical adhesion promoting element forming step comprises forming a hole proximate to the front end of said strap.

9. A method of making a cable tie, said method comprising the steps of:

(a) continuously-molding a length of strap material using a rotary extrusion process, said length of strap material having a front end, a rear end and a bottom surface, said bottom surface being shaped to include along its entire length a plurality of laterally-extending teeth;

(b) then, cutting said length of strap material to yield a strap of finished size, said individual strap having a front end and a tail; and (b) then, insert-molding a front portion around said front end of said strap, said front portion comprising a head, said head being shaped to include a channel through which said tail may be inserted and also being shaped to include a locking tang for lockably engaging said teeth once inserted therepast to form a locked closed loop.

10. The method as claimed in claim 9 further comprising, prior to said insert-molding step, the step of forming a transverse hole in said strap proximate to said front end of said strap and wherein said insert-molding step comprises molding through said transverse hole.

11. A method of making a plurality of cable ties, said method comprising the steps of:

(a) continuously-molding a length of strap material, said length of strap material having a front end and a rear end, wherein said continuously molding step comprises using rotary extrusion molding;

(b) then, cutting said length of strap material to yield a plurality of individual straps of finished size, each of said individual straps having a front end and a tail; and (c) then, simultaneously insert-molding a front portion around said front end of each of a plurality of said individual straps, each of said front portions comprising a head, said head being shaped to include a channel through which said tail may be inserted and also being shaped to include means for engaging said strap to form a locked closed loop.

12. A method of making a plurality of cable ties, said method comprising the steps of:

(a) continuously-molding a length of strap material, said length of strap material having a front end and a rear end;

(b) then, cutting said length of strap material to yield a plurality of individual straps of finished size, each of said individual straps having a front end and a tail, wherein said cutting step comprises punch-cutting said strap material and shaping the front and tail ends of the individual straps; and (c) then, simultaneously insert-molding a front portion around said front end of each of a plurality of said individual straps, each of said front portions comprising ahead, said head being shaped to include a channel through which said tail may be inserted and also being shaped to include means for engaging said strap to form a locked closed loop.

* * * * *